(12) United States Patent
Yaguchi et al.

(10) Patent No.: US 11,440,394 B2
(45) Date of Patent: Sep. 13, 2022

(54) VEHICLE DRIVE SYSTEM

(71) Applicant: TOYOTA JIDOSHA KABUSHIKI KAISHA, Toyota (JP)

(72) Inventors: Hiroshi Yaguchi, Susono (JP); Naoyuki Kishimoto, Susono (JP); Naoki Marukawa, Numazu (JP); Shuichi Iwata, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 185 days.

(21) Appl. No.: 16/682,435

(22) Filed: Nov. 13, 2019

(65) Prior Publication Data
US 2020/0156454 A1 May 21, 2020

(30) Foreign Application Priority Data
Nov. 16, 2018 (JP) .............................. JP2018-215996

(51) Int. Cl.
*B60W 10/00* (2006.01)
*B60K 6/26* (2007.10)
(Continued)

(52) U.S. Cl.
CPC .............. *B60K 6/26* (2013.01); *B60L 15/007* (2013.01); *B60L 50/61* (2019.02); *B60L 2210/10* (2013.01);
(Continued)

(58) Field of Classification Search
CPC .......... B60K 6/26; B60K 6/405; B60K 6/445; B60K 6/36; B60K 6/50; B60K 6/24;
(Continued)

(56) References Cited

U.S. PATENT DOCUMENTS 6,166,498 A * 12/2000 Yamaguchi ............. B60L 50/16
318/34
7,952,856 B2 * 5/2011 Otsuka .................. B60W 10/08
361/624
(Continued)

FOREIGN PATENT DOCUMENTS

EP           1000790 A2    5/2000
JP        2000-217205 A    8/2000
(Continued)

OTHER PUBLICATIONS

U.S. Appl. No. 16/681,971, filed Nov. 13, 2019.

*Primary Examiner* — James M Dolak
(74) *Attorney, Agent, or Firm* — Sughrue Mion, PLLC

(57) ABSTRACT

A vehicle drive system includes: a case accommodating a first rotary electric machine and a second rotary electric machine that are arranged to have respective rotational axes parallel to each other and to be radially adjacent to each other; and a power control device configured to control the first rotary electric machine and the second rotary electric machine. The case includes a peripheral wall portion surrounding the first rotary electric machine and the second rotary electric machine, and the power control device is mounted in a mounting section provided on an outer peripheral surface of the peripheral wall portion. A lower part of the power control device is located in a space surrounded by a line connecting a first cross point, and a second cross point, the first rotary electric machine and the second rotary electric machine.

6 Claims, 13 Drawing Sheets

(51) Int. Cl.
 *B60L 15/00* (2006.01)
 *B60L 50/61* (2019.01)

(52) U.S. Cl.
 CPC ....... *B60Y 2200/92* (2013.01); *B60Y 2306/05* (2013.01)

(58) Field of Classification Search
 CPC ... B60K 6/00; B60K 6/20; B60K 1/02; B60K 1/00; B60K 2001/003; B60L 15/007; B60L 15/00; B60L 50/61; B60L 50/00; B60L 2210/10; H02K 5/22; H02K 5/04; H02K 5/00; H02K 11/30; H02K 11/00; H02K 7/006; H02K 9/19; H05K 7/20927; H05K 7/2089
 See application file for complete search history.

(56) References Cited

U.S. PATENT DOCUMENTS

| | | | | |
|---|---|---|---|---|
| 8,643,235 | B2 * | 2/2014 | Omiya | B60L 50/61 310/64 |
| 8,875,825 | B2 * | 11/2014 | Asakura | H02K 9/19 310/52 |
| 9,096,186 | B2 * | 8/2015 | Iwata | B60R 16/0239 |
| 9,205,749 | B2 * | 12/2015 | Sakamoto | B60L 50/51 |
| 9,358,870 | B2 * | 6/2016 | Hotta | B60K 6/40 |
| 9,565,792 | B2 * | 2/2017 | Ishikawa | F28F 9/26 |
| 9,630,501 | B2 * | 4/2017 | Shiba | B60R 16/0215 |
| 9,849,791 | B2 * | 12/2017 | Suzuki | F16H 61/0006 |
| 10,391,849 | B2 * | 8/2019 | Suzuki | B60K 6/24 |
| 10,675,962 | B2 * | 6/2020 | Urabe | B60K 6/442 |
| RE48,173 | E * | 8/2020 | Takahashi | B60K 6/48 |
| 11,195,649 | B2 * | 12/2021 | Vafakhah | B60K 6/405 |
| 11,201,523 | B2 * | 12/2021 | Ishikawa | H02K 7/1815 |

FOREIGN PATENT DOCUMENTS

| | | |
|---|---|---|
| JP | 2012-065436 A | 3/2012 |
| JP | 2012-170177 A | 9/2012 |
| JP | 2017-152612 A | 8/2017 |
| WO | 2012/107826 A1 | 8/2012 |

* cited by examiner

VEHICLE DRIVE SYSTEM

CROSS-REFERENCE TO RELATED APPLICATIONS

The disclosure of Japanese Patent Application No. 2018-215996 filed on Nov. 16, 2018 including the specification, drawings and abstract is incorporated herein by reference in its entirety.

BACKGROUND

1. Technical Field

The present disclosure relates to a vehicle drive system.

2. Description of Related Art

Japanese Patent Application Publication No. 2012-065436 discloses a vehicle drive system in which a power control unit (PCU), which is a power control device for controlling electric power supplied to a first rotary electric machine and a second rotary electric machine, is directly mounted to a case in which the first rotary electric machine and the second rotary electric machine including respective rotational axes parallel to each other and disposed radially adjacent to each other are accommodated. This vehicle drive system, in a state in which rotary electric machine connection terminals connected to the rotary electric machines are held, includes: a terminal block fixed so as to cover an opening provided to the case; and a reactor configuring a part of the power control unit, and the reactor is fixed to the terminal block inside the case, and in addition to the rotary electric machine connection terminals, a reactor connection terminal connected to the reactor is held to the terminal block so as to be exposed to the outside of the case.

SUMMARY

However, in the vehicle drive system of the related art, a recessed space formed between the first rotary electric machine and the second rotary electric machine is not effectively utilized, and the height (mounting height) of the PCU mounted to the case becomes higher, etc.; therefore, there is room for improvement in arrangement of the PCU.

This disclosure provides a vehicle drive system which can improve arrangement of a power control device.

A vehicle drive system according to an aspect of the present disclosure relates to a vehicle drive system including a case and a power control device. The case accommodates a first rotary electric machine and a second rotary electric machine that are arranged to include respective rotational axes parallel to each other and to be radially adjacent to each other. The power control device is configured to control electric power supplied to the first rotary electric machine and the second rotary electric machine. The case includes a peripheral wall portion surrounding the first rotary electric machine and the second rotary electric machine. The power control device is mounted in a mounting section provided on an outer peripheral surface of the peripheral wall portion. A lower part of the power control device is located within a space surrounded by a line connecting a first cross point and a second cross point, the first rotary electric machine and the second rotary electric machine. The first cross point is a cross point of a center line of the second rotary electric machine in a perpendicular direction with the case located on a side where the mounting section in which the power control device is mounted is located. The second cross point is a cross point of a tangent of the first rotary electric machine intersecting a center line of the first rotary electric machine in a horizontal direction with the case on the side where the mounting section is located.

According to the vehicle drive system of the above aspect, the lower part of the power control device is located between the respective outer peripheral surfaces of the first rotary electric machine and the second rotary electric machine that are disposed at positions inclined relative to each other, to thereby reduce the height of the power control device mounted in the mounting section of the case to be lower.

In the above vehicle drive system, the vehicle drive system may further include: an input member drivingly coupled to an internal combustion engine; and a power distribution device configured to distribute driving power of the input member to the first rotary electric machine. The second rotary electric machine may be drivingly coupled to the output member. The second rotary electric machine may be disposed obliquely above the first rotary electric machine, and at least a part of the space may be located in a recessed space formed between an outer peripheral surface of the first rotary electric machine and an outer peripheral surface of the second rotary electric machine.

According to the above configuration, the lower part of the power control device can be disposed in the recessed space formed between the respective outer peripheral surfaces of the first rotary electric machine and the second rotary electric machine that are disposed at positions inclined relative to each other, to thereby reduce the height of the power control device mounted in the mounting section of the case to be lower.

In the above vehicle drive system, the vehicle drive system may further include a terminal block that holds a second connection terminal electrically connected to a first connection terminal included in the power control device, and is disposed beside the lower part of the power control device.

According to the above configuration, the height of the power control device mounted in the mounting section of the case can be reduced to be lower.

In the above vehicle drive system, the power control device may be mounted in a state of being inclined from the horizontal direction in the mounting section.

According to the above configuration, the height of the power control device mounted in the mounting section of the case can be reduced to be lower.

In the above vehicle drive system, the power control device may include a control board, a power card and a cooler, a reactor and a capacitor, and a water jacket that are sequentially arranged from the top in a height direction.

According to the above configuration, it is possible to configure the power control device to have a shape corresponding to the recessed space formed between the outer peripheral surface of the first rotary electric machine and the outer peripheral surface of the second rotary electric machine.

In the above vehicle drive system, the power control device may include a direct current-direct current converter disposed below the water jacket.

According to the above configuration, the direct current-direct current converter can be cooled by the water jacket, and the power control device can be configured to have a shape corresponding to the recessed space formed between the outer peripheral surface of the first rotary electric machine and the outer peripheral surface of the second rotary electric machine.

In the above vehicle drive system, when the power control device is not provided with the direct current-direct current converter, (i) the control board, the power card and the cooler, and the capacitor may be disposed sequentially from the top in the height direction; and (ii) the reactor may be disposed in a longitudinal direction of a power stack including the power card and the cooler in such a manner that the reactor is in contact with the coolers.

According to the above configuration, the height of the power control device mounted in the mounting section of the case can be reduced to be lower.

According to the vehicle drive system of the aspect of the present disclosure, by effectively utilizing the recessed space formed between the first rotary electric machine and the second rotary electric machine, it is possible to reduce the height of the power control device to be lower, to thereby attain an effect to improve the arrangement of the power control device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
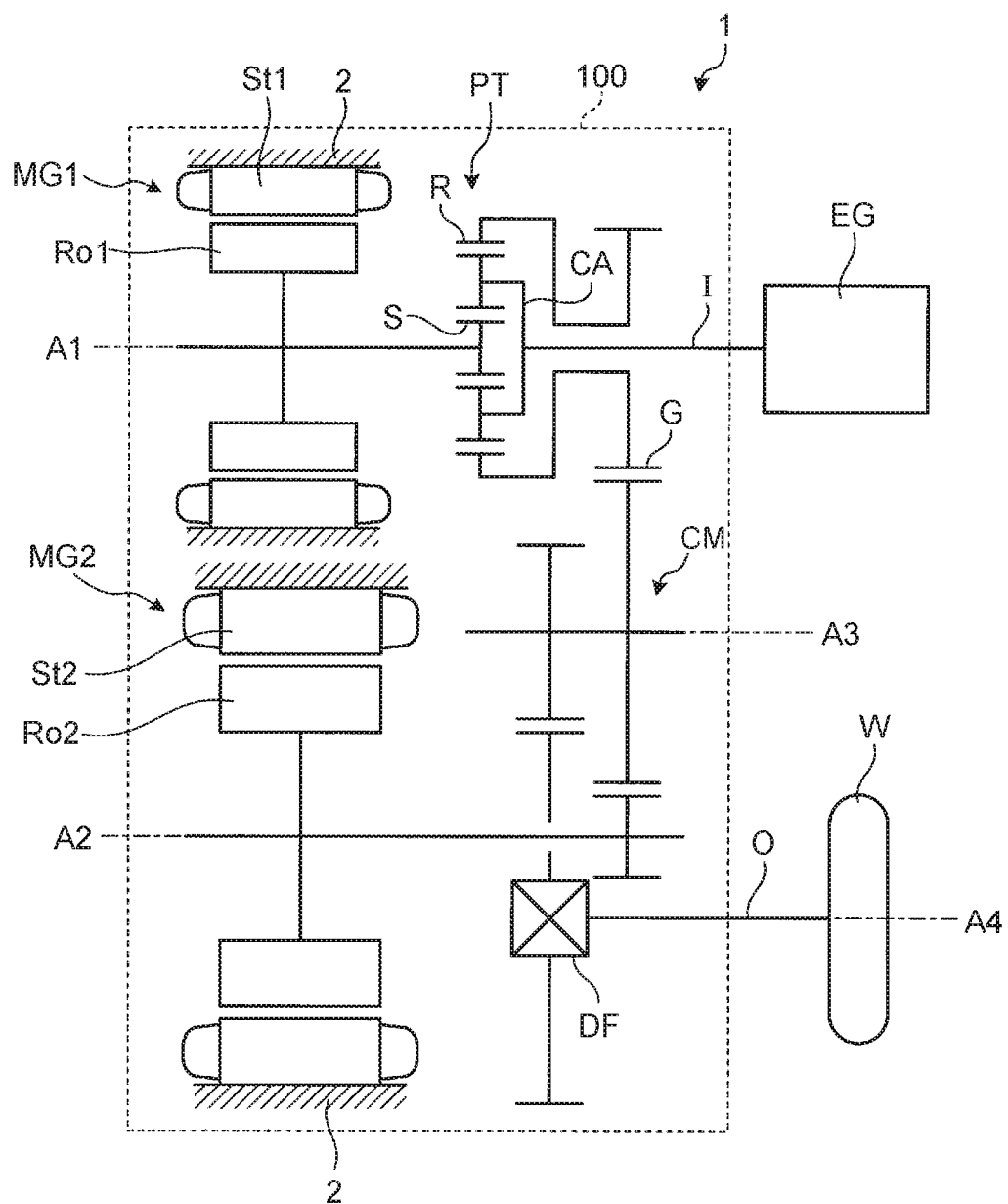
FIG. 1 is a skeleton view of a vehicle drive system according to a first embodiment.

Hereinafter, a first embodiment of a vehicle drive system according to the present disclosure will be described. The present disclosure is not limited by the first embodiment. In the first embodiment, a case in which the vehicle drive system according to the present disclosure is applied to a vehicle drive system provided with both an internal combustion engine and rotary electric machines as a driving power source of a vehicle will be described as an example. In the following description, unless otherwise mentioned, a direction parallel to a rotation axis of the rotary electric machine is referred to as an "axial direction". In addition, respective directions are appropriately indicated by using arrows in the drawings, while referring to a front side in a front-rear direction of the vehicle in which the vehicle drive system is mounted as "FR", a right side in a left-right direction of the vehicle as "RH", and an upper side in a height direction of the vehicle as "UPPER".

FIG. 1 is a skeleton view of the vehicle drive system according to the first embodiment. The vehicle drive system 1 according to the first embodiment includes an internal combustion engine EG and a first rotary electric machine MG1 and a second rotary electric machine MG2 accommodated in a transaxle case 2. The transaxle case 2 is an example of a "case" of the present disclosure. The first rotary electric machine MG1 and the second rotary electric machine MG2 are two rotary electric machines that function as a driving power source of the vehicle.

First, an entire configuration of the vehicle drive system 1 will be described. As shown in FIG. 1, the vehicle drive system 1 includes an input shaft I drivingly coupled to the internal combustion engine EG, the first rotary electric machine MG1, the second rotary electric machine MG2, a power distribution device PT, and an output gear G, a counter gear mechanism CM, and a differential gear DF. Each of these components is accommodated in the transaxle case 2 fixed to a vehicle body.

The input shaft I is drivingly coupled to the internal combustion engine EG. Here, the internal combustion engine EG is an apparatus driven by combustion of a fuel inside the engine so as to take out motive power, and for example, one of various well-known engines, such as a gasoline engine and a diesel engine, can be used. In the first embodiment, the input shaft I is drivingly coupled to an output rotating shaft such as a crankshaft of the internal combustion engine EG so as to rotate integrally with the output rotating shaft. The input shaft I may be suitably configured to be drivingly coupled to the output rotating shaft of the internal combustion engine EG via another member, such as a damper and a clutch.

The first rotary electric machine MG1 includes a first stator St1 fixed to the transaxle case 2, and a first rotor Ro1 rotatably supported inward of the first stator St1 in a radial direction. The first rotor Ro1 of the first rotary electric machine MG1 is drivingly coupled to a sun gear S of the power distribution device PT so as to rotate integrally with the sun gear S. Further, the second rotary electric machine MG2 includes a second stator St2 fixed to the transaxle case 2 and a second rotor Ro2 rotatably supported inward of the second stator St2 in the radial direction. The second rotor Ro2 of the second rotary electric machine MG2 is drivingly coupled to the differential gear DF via the counter gear mechanism CM. The first rotary electric machine MG1 and the second rotary electric machine MG2 are each electrically connected to a battery (not shown) as a power storage device. The battery is an example of the power storage device. Another power storage device such as a capacitor can be used, or power storage devices of multiple types can be used in combination. Further, the battery can be configured to be chargeable by an external power supply, such as a household power supply.

The first rotary electric machine MG1 and the second rotary electric machine MG2 each have a function as a motor (an electric motor) generating motive power by receiving supply of electric power, and also as a generator (an electric power generator) generating electric power by receiving supply of motive power. Here, when the first rotary electric machine MG1 and the second rotary electric machine MG2 function as generators, they generate electric power by torque of the internal combustion engine EG or inertia force of the vehicle, charge the battery, or supply electric power for driving the other rotary electric machine functioning as a motor. On the other hand, when the first rotary electric machine MG1 and the second rotary electric machine MG2 function as motors, they perform power running by receiving supply of electric power with which the battery is charged or supply of electric power generated by the other rotary electric machine functioning as the generator.

As shown in FIG. 1, the power distribution device PT is configured by a planetary gear mechanism of a single pinion type disposed coaxially with the input shaft I. That is, the power distribution device PT includes, as rotating elements, a carrier CA supporting a plurality of pinion gears, and the sun gear S and a ring gear R respectively meshing with the pinion gears. These three rotating elements are arranged such that the sun gear S, the carrier CA, and the ring gear R are located in order of their rotational speeds. The sun gear S is drivingly coupled to the first rotor Ro1 of the first rotary electric machine MG1 so as to rotate integrally with the first rotor Ro1. The carrier CA is drivingly coupled to the input shaft I so as to rotate integrally with the input shaft I. The ring gear R is drivingly coupled to the output gear G so as to rotate integrally with the output gear G. The output gear G is provided radially outward of the input shaft I between the power distribution device PT and the internal combustion engine EG in the axial direction.

The power distribution device PT has a function to distribute the driving power (here, "driving power" is used synonymously with "torque") of the internal combustion engine EG, which is input through the input shaft I, to the first rotary electric machine MG1 and the output gear G. Further, the rotational speed and the torque of the first rotary electric machine MG1 are controlled in a state in which the torque of the input shaft I (internal combustion engine EG) is input into the carrier CA of the power distribution device PT, and whereby the rotational speed of the input shaft I can be continuously changed and transmitted to the output gear G.

The output gear G is drivingly coupled to the differential gear DF via the counter gear mechanism CM. The second rotor Ro2 of the second rotary electric machine MG2 is also drivingly coupled to the differential gear DF via the counter gear mechanism CM. Thus, in the first embodiment, the second rotor Ro2 of the second rotary electric machine MG2 is drivingly coupled to the output gear G via the counter gear mechanism CM. Then, in the first embodiment, part of the torque of the input shaft I (internal combustion engine EG) distributed to the output gear G by the power distribution device PT and the output torque of the second rotary electric machine MG2 are synthesized and transmitted to the differential gear DF. The differential gear DF is drivingly coupled to a wheel W via an axle O, and distributes and transmits rotation and torque input into the differential gear DF to the two left and right wheels W.

Figure 2:
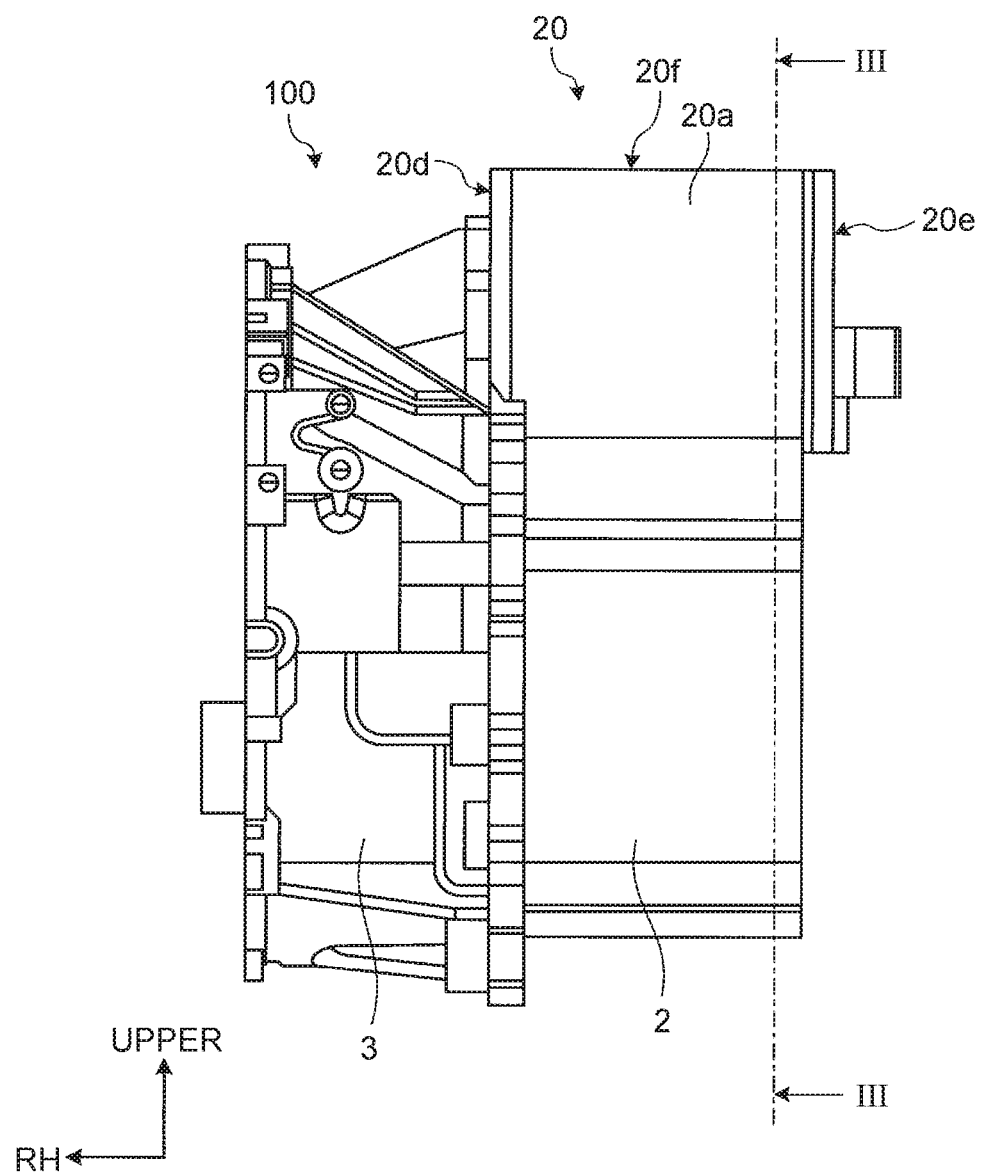
FIG. 2 is an external view of a transaxle case of the vehicle drive system as viewed from a vehicle front side.
Figure 3:
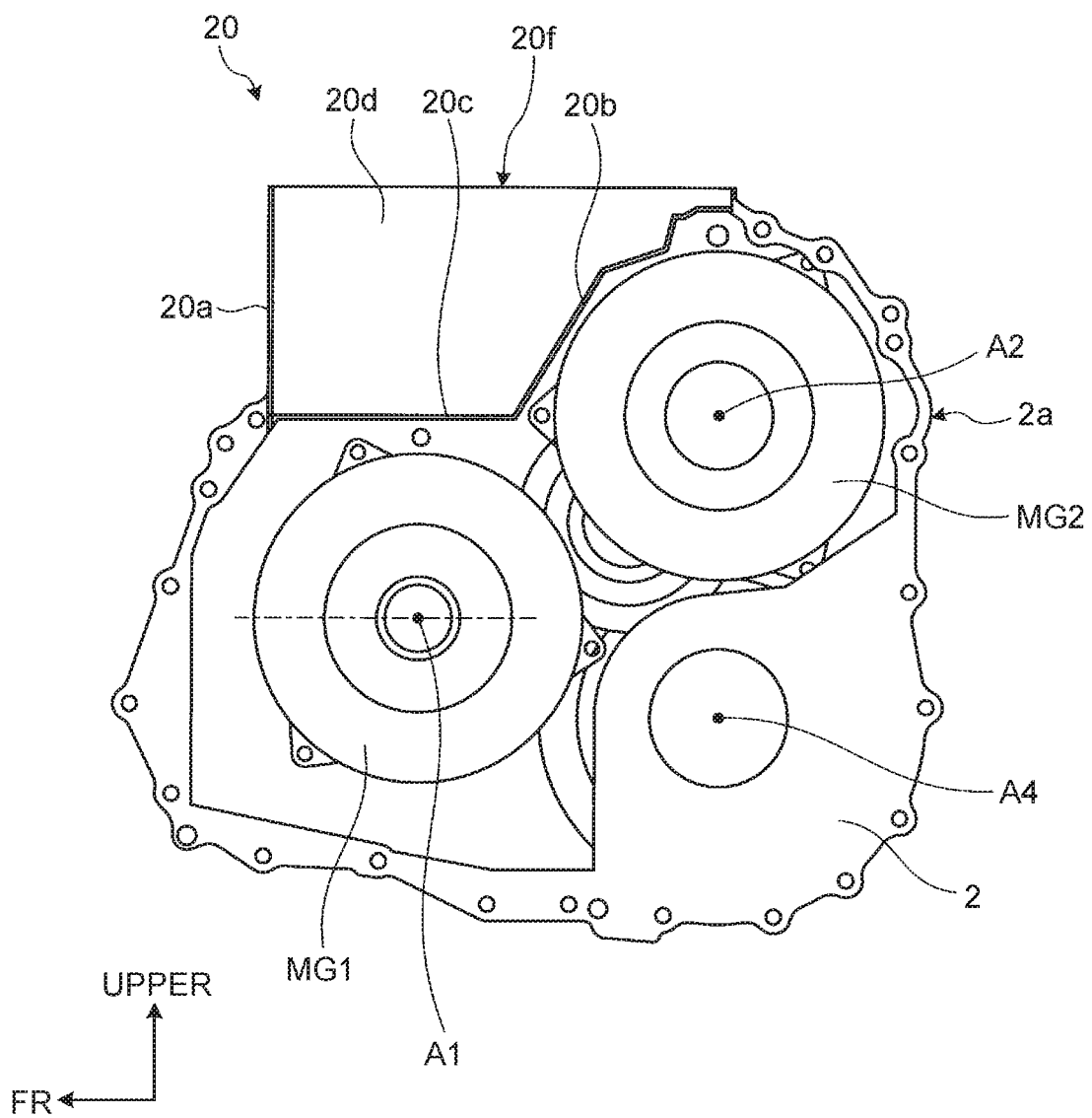
FIG. 3 is a sectional view of the transaxle case taken along line III-III of FIG. 2.

FIG. 2 is an external view of the transaxle case 2 as viewed from the front side of the vehicle. FIG. 3 is a sectional view of the transaxle case 2 taken along line III-III of FIG. 2. As aforementioned, a transaxle 100 is structured such that the transaxle case 2 accommodating the first rotary electric machine MG1 and the second rotary electric machine MG2, the transaxle housing 3 coupled to one side of the transaxle case 2 (the side on which the internal combustion engine EG is disposed), and a cover (not shown) coupled to the other side of the transaxle case 2 (the opposite side to the side on which the internal combustion engine EG is disposed) are integrally assembled.

In the transaxle 100 of the first embodiment, the input shaft I, the power distribution device PT, the first rotary electric machine MG1, and the output gear G are all disposed on a first axis A1. The second rotary electric machine MG2 is disposed on a second axis A2. The counter gear mechanism CM is disposed on a third axis A3. The differential gear DF is disposed on a fourth axis A4. These components are arranged parallel to one another at different positions. In the first embodiment, the second rotary electric machine MG2 is disposed obliquely above the first rotary electric machine MG1. Further, as shown in FIG. 3, the first axis A1, the second axis A2, and the fourth axis A4 are arranged such that respective line segments connecting these three axes form an acute triangle. The first rotary electric machine MG1 disposed on the first axis A1, the second rotary electric machine MG2 disposed on the second axis A2, and the differential gear DF disposed on the fourth axis A4 are arranged so as to be adjacent to one another in the radial direction. The third axis A3 on which the counter gear mechanism CM is disposed is located inward of the acute triangle defined by connecting the three axes of the first axis A1, the second axis A2, and the fourth axis A4.

The transaxle case 2 includes an outer peripheral wall portion 2a that covers at least radially outer peripheries of the first rotary electric machine MG1 and the second rotary electric machine MG2. The outer peripheral wall portion 2a is formed in an irregular cylindrical shape that extends along and covers respective outer peripheral surfaces of the first rotary electric machine MG1 and the second rotary electric machine MG2, which are radially adjacent to each other, and of the differential gear DF. The transaxle case 2 is formed by using a metal material such as aluminum.

As shown in FIG. 2 and FIG. 3, a PCU mounting section 20, in which a not-shown power control unit (PCU) as a power control device for controlling electric power supplied to the first rotary electric machine MG1 and the second rotary electric machine MG2 is mounted, is provided on the top of the transaxle case 2 and on an outer peripheral surface of the outer peripheral wall portion 2a. The PCU mounting section 20 has a box-like shape having an opening top surface, and includes: a front wall portion 20a and a rear wall portion 20b facing each other in the vehicle front-rear direction; a right wall portion 20d and a left wall portion 20e facing each other in the vehicle left-right direction; a bottom wall portion 20c forming a bottom of the PCU mounting section 20; and an opening portion 20f that allows the top surface to open. The rear wall portion 20b and the bottom wall portion 20c are included in the outer peripheral wall portion 2a of the transaxle case 2. The rear wall portion 20b is inclined rearward relative to the bottom wall portion 20c in the vehicle front-rear direction, and an angle defined by the rear wall portion 20b and the bottom wall portion 20c is an obtuse angle in a cross-section perpendicular to the axial direction of the transaxle case 2. Further, a corner portion defined by the rear wall portion 20b and the bottom wall portion 20c is located in a recessed space formed between the first rotary electric machine MG1 and the second rotary electric machine MG2.

Figure 4:
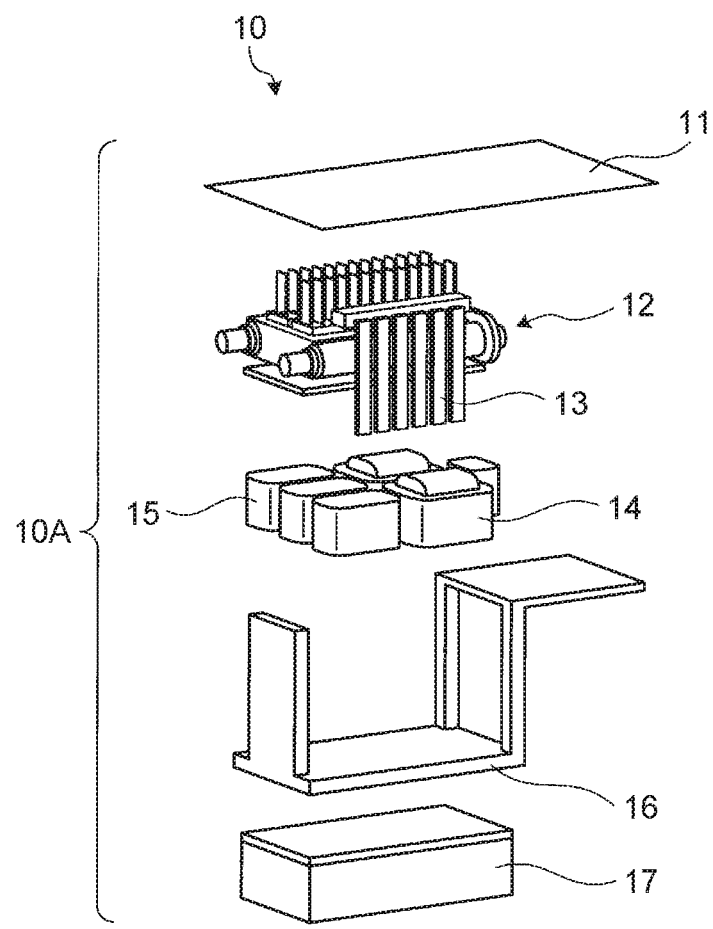
FIG. 4 is an exploded view of a PCU of the vehicle drive system.

FIG. 4 is an exploded view of the PCU 10. The PCU 10 includes a control board 11, a power stack 12, a PCU-side bus bar 13, a reactor 14, a capacitor 15, a water jacket 16, a DC-DC converter 17, and a not-shown PCU cover 18 (see FIG. 5), etc.

The power stack 12 is configured by stacking a plurality of power cards, each formed by modularizing an insulated gate bipolar transistor (IGBT), a diode, and the like that control the first rotary electric machine MG1 and the second rotary electric machine MG2, with cooling plates of coolers interposed between the power cards, and the power stack 12 is controlled by the control board 11. The PCU-side bus bar 13 which is a first connection terminal is electrically connected to a transaxle-side bus bar which is a second connection terminal. The reactor 14 is used to boost battery voltage. The capacitor 15 smooths DC voltage from the direct current-direct current converter (hereinafter "direct current-direct current converter" is called as "DC-DC converter") 17 and supplies the smoothed DC voltage to the power stack 12, or smooths DC voltage from the power stack 12 and supplies the smoothed DC voltage to the DC-DC converter 17, or the like. The water jacket 16 cools the reactor 14, the DC-DC converter 17, and the like by a coolant flowing through a water passage provided inside, and is also used as a holding member that holds the power stack 12, the reactor 14, the capacitor 15, and the like. The DC-DC converter 17 steps down the DC voltage from the battery or the PCU 10, supplies the stepped-down DC voltage to auxiliary equipment such as vehicle lighting, and charges a battery for the auxiliary equipment with the stepped-down DC voltage. The PCU cover 18 has a box-like shape having an opening lower surface, and is attached to the top of the PCU mounting section 20 so as to close the opening portion 20*f*. In addition, a depth of the PCU cover 18 is set to be deep enough to surround the periphery of the control board 11.

In the first embodiment, the PCU 10 has a multilayer structure in the height direction, and is configured as a PCU assembly 10A formed by stacking and integrating the DC-DC converter 17, the water jacket 16, the reactor 14 and the capacitor 15, the power stack 12, and the control board 11 in this order from the lower side (transaxle 100 side) in the height direction of the PCU 10. In the PCU assembly 10A, the power stack 12, the reactor 14 and the capacitor 15, and the DC-DC converter 17 are fastened to the water jacket 16.

In the PCU assembly 10A, the reactor 14 and the capacitor 15, the water jacket 16, and the DC-DC converter 17 are sequentially stacked below the power stack 12. Therefore, the PCU assembly 10A is arranged to protrude more downward (toward transaxle 100 side), as compared with a case in which the reactor 14 and the capacitor 15, and the DC-DC converter 17 are arranged side by side in a flat manner below the water jacket 16, for example.

When the PCU 10 is mounted in the PCU mounting section 20, a part of the lower part of the PCU 10, for example, respective parts of the reactor 14 and the DC-DC converter 17 of the PCU assembly 10A are disposed in the recessed space formed between the first rotary electric machine MG1 and the second rotary electric machine MG2.

Figure 5:
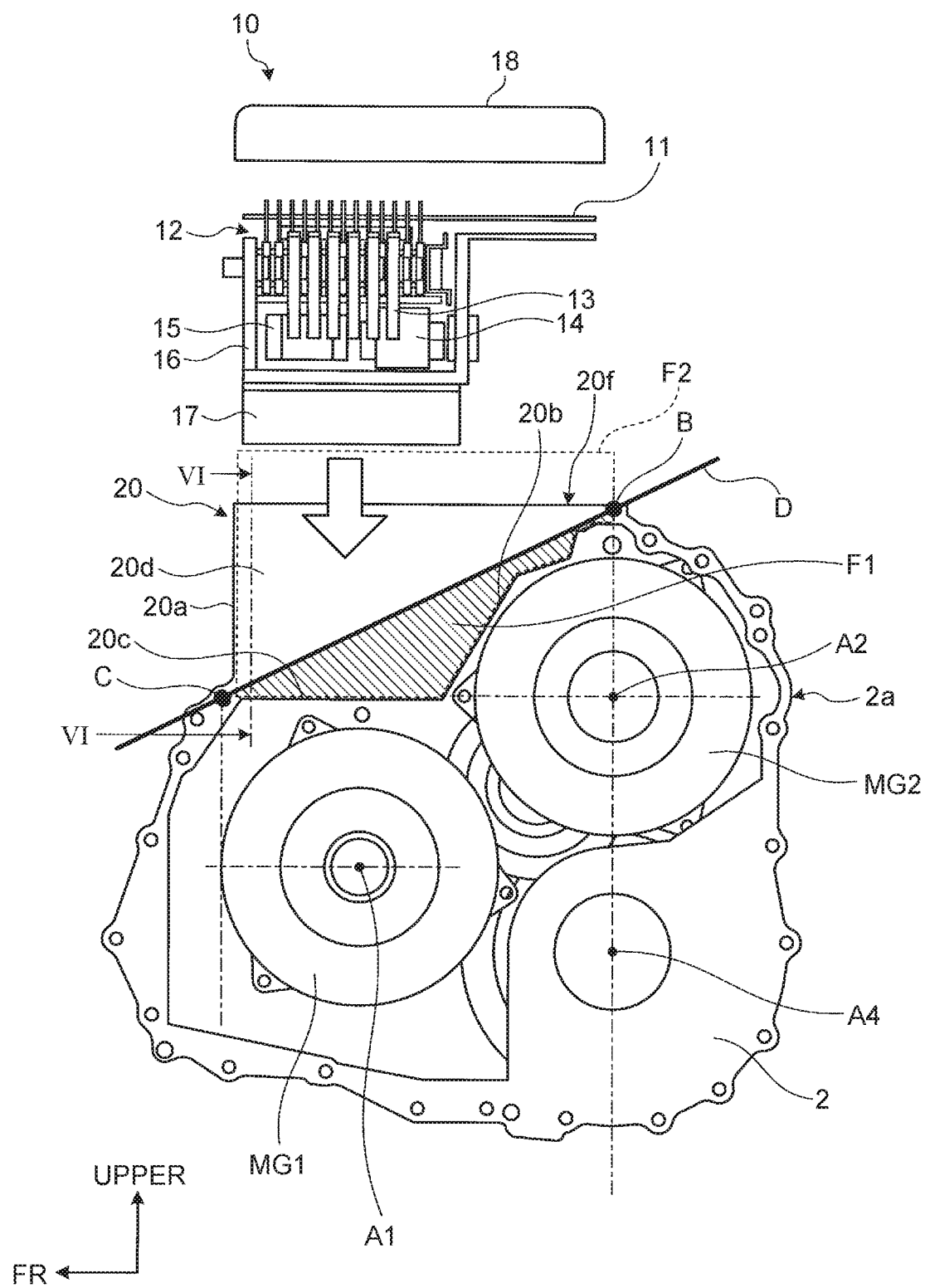
FIG. 5 is an explanatory view explaining mounting of the PCU into a PCU mounting section where the PCU is to be mounted.

Specifically, as shown in FIG. 5, when the PCU 10 is mounted into the PCU mounting section 20, the PCU 10 is disposed within a mounting region F2 formed by the PCU mounting section 20 and the internal space of the PCU cover 18 when the PCU cover 18 is attached to the top of the PCU mounting section 20. Further, a part of the lower part of the PCU 10 is located within a space in the mounting region F2, the space surrounded by a line D, the first rotary electric machine MG1, and the second rotary electric machine MG2, where the line D connects a cross point B between a center line of the second rotary electric machine MG2 in the perpendicular direction and the transaxle case 2, and a cross point C between a tangent of the first rotary electric machine MG1 intersecting a center line of the first rotary electric machine MG1 in the horizontal direction and the transaxle case 2. In other words, in the cross-section orthogonal to the axial direction of the transaxle case 2, a part of the lower part of the PCU 10 is located within a region F1 surrounded by the rear wall portion 20*b*, the bottom wall portion 20*c* of the PCU mounting section 20, and the line D.

Thus, in the mounting of the PCU 10 to the transaxle case 2, by effectively utilizing the recessed space formed between the first rotary electric machine MG1 and the second rotary electric machine MG2, the height (mounting height) of the PCU 10 mounted to the transaxle case 2 can be reduced to be lower, and thus the arrangement of the PCU 10 can be improved.

After the PCU assembly 10A is placed in the PCU mounting section 20, the PCU cover 18 is fixed to the top of the PCU mounting section 20 so as to cover the opening portion 20*f*. Thereby, contamination of foreign substances into the PCU 10 can be suppressed.

In the first embodiment, the PCU 10 may be configured such that some of the components included in the PCU 10 are located outside the mounting region F2.

Further, in the first embodiment, the inside of the transaxle case 2 in which the first rotary electric machine MG1 and the second rotary electric machine MG2 are disposed is partitioned from the inside of the PCU mounting section 20 in which the PCU 10 is mounted by the rear wall portion 20*b* and the bottom wall portion 20*c*. In the first embodiment, the DC-DC converter 17 of the PCU 10 is cooled by the water jacket 16.

Figure 6:
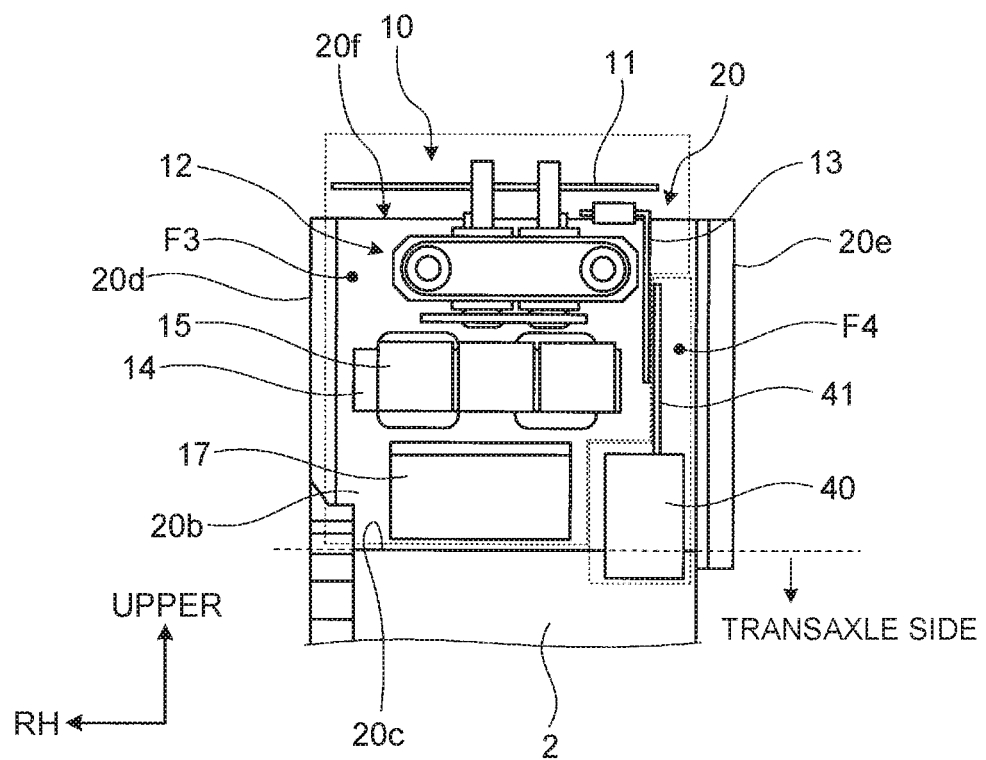
FIG. 6 is a sectional view taken along line VI-VI of FIG. 5 with the PCU mounted in the PCU mounting section.

FIG. 6 is a sectional view taken along line VI-VI of FIG. 5 with the PCU 10 mounted in the PCU mounting section 20.

In the first embodiment, as shown in FIG. 6, the inside of the PCU mounting section 20 is divided into a PCU-side space F3 and a transaxle-side space F4, and the PCU-side space F3 and the transaxle-side space F4 communicate with each other. The PCU 10 is disposed in the PCU-side space F3. Further, a terminal block 40 and a transaxle-side bus bar 41 are disposed in the transaxle-side space F4. In the first embodiment, the PCU 10 side and the transaxle 100 side are electrically connected to each other through a bus bar connection between the PCU-side bus bar 13 and the transaxle-side bus bar 41 in the PCU mounting section 20.

Figure 7:
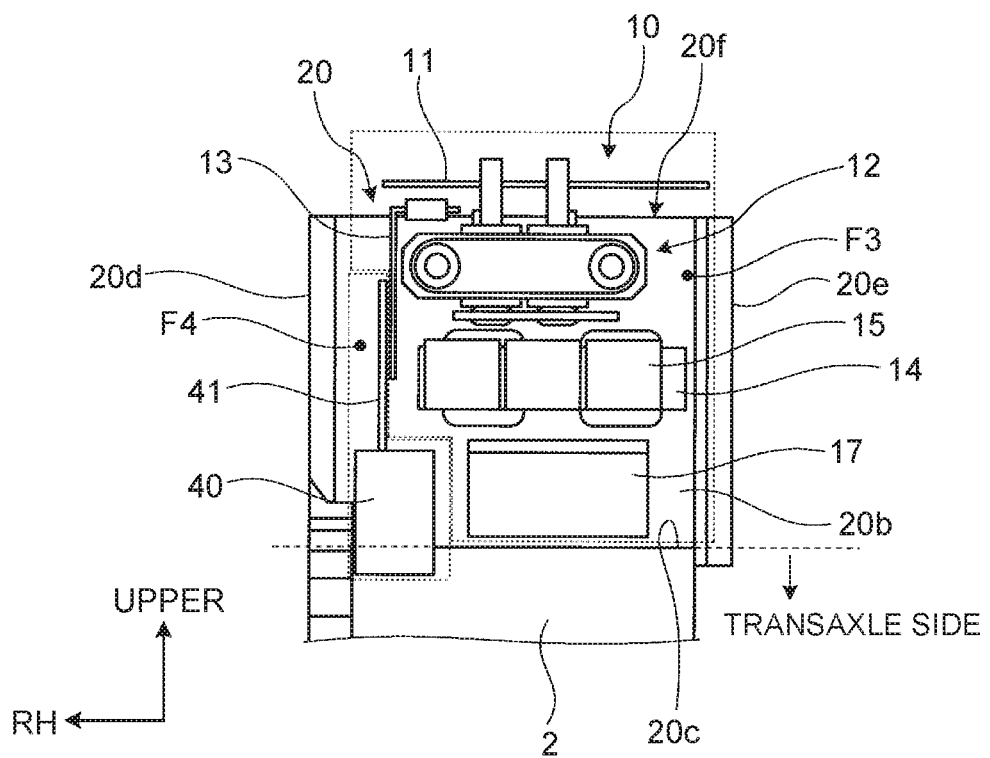
FIG. 7 is a view showing a case in which a terminal block of the vehicle drive system is disposed beside a direct current-direct current converter and located on a right side in a vehicle left-right direction relative to the PCU.

The transaxle-side bus bar 41 is provided upright on the top surface of the terminal block 40 partially protruding from the bottom wall portion 20*c* from the transaxle 100 side toward the PCU 10 side. The terminal block 40 is located beside the DC-DC converter 17 provided to the lower part of the PCU 10 and is located on the left side in the vehicle left-right direction. As shown in FIG. 7, the terminal block 40 may be located beside the DC-DC converter 17 provided to the lower part of the PCU 10 and is located on the right side in the vehicle left-right direction.

In the first embodiment, it can be configured that the terminal block 40 and the transaxle-side bus bar 41 are out of contact with the respective components included in the PCU 10, and at the same time, the height (mounting height) of the PCU 10 mounted to the transaxle case 2 can be reduced to be lower than the height of the PCU 10 when the terminal block 40 is located below the DC-DC converter 17 of the PCU 10.

Hereinafter, a second embodiment of a vehicle drive system according to the present disclosure will be described.

In the second embodiment, description on parts common to those of the first embodiment will be appropriately omitted.

Figure 8:
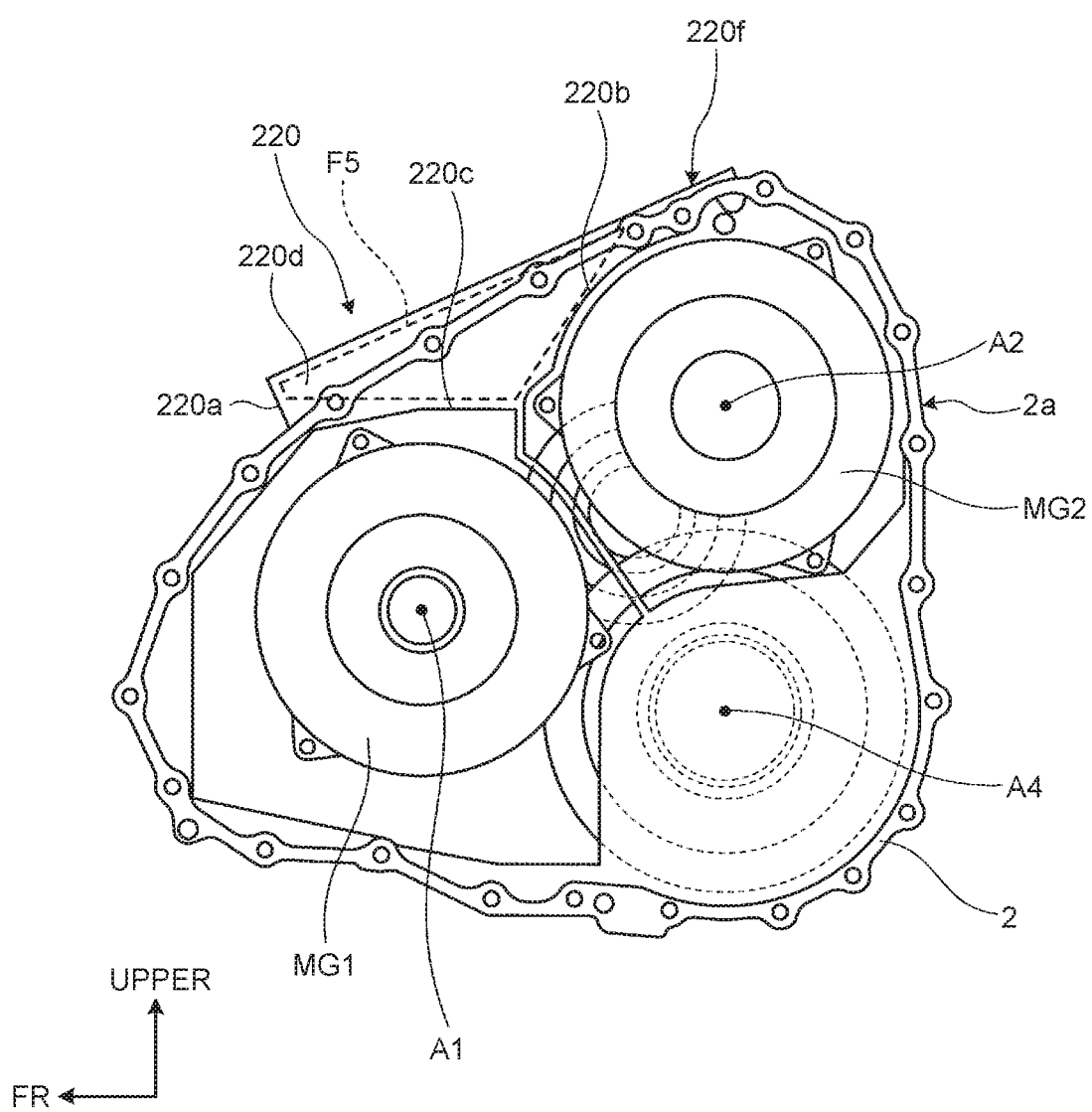
FIG. 8 is a sectional view orthogonal to an axial direction of a transaxle case to which no PCU is mounted in a vehicle drive system according to a second embodiment.
Figure 9:
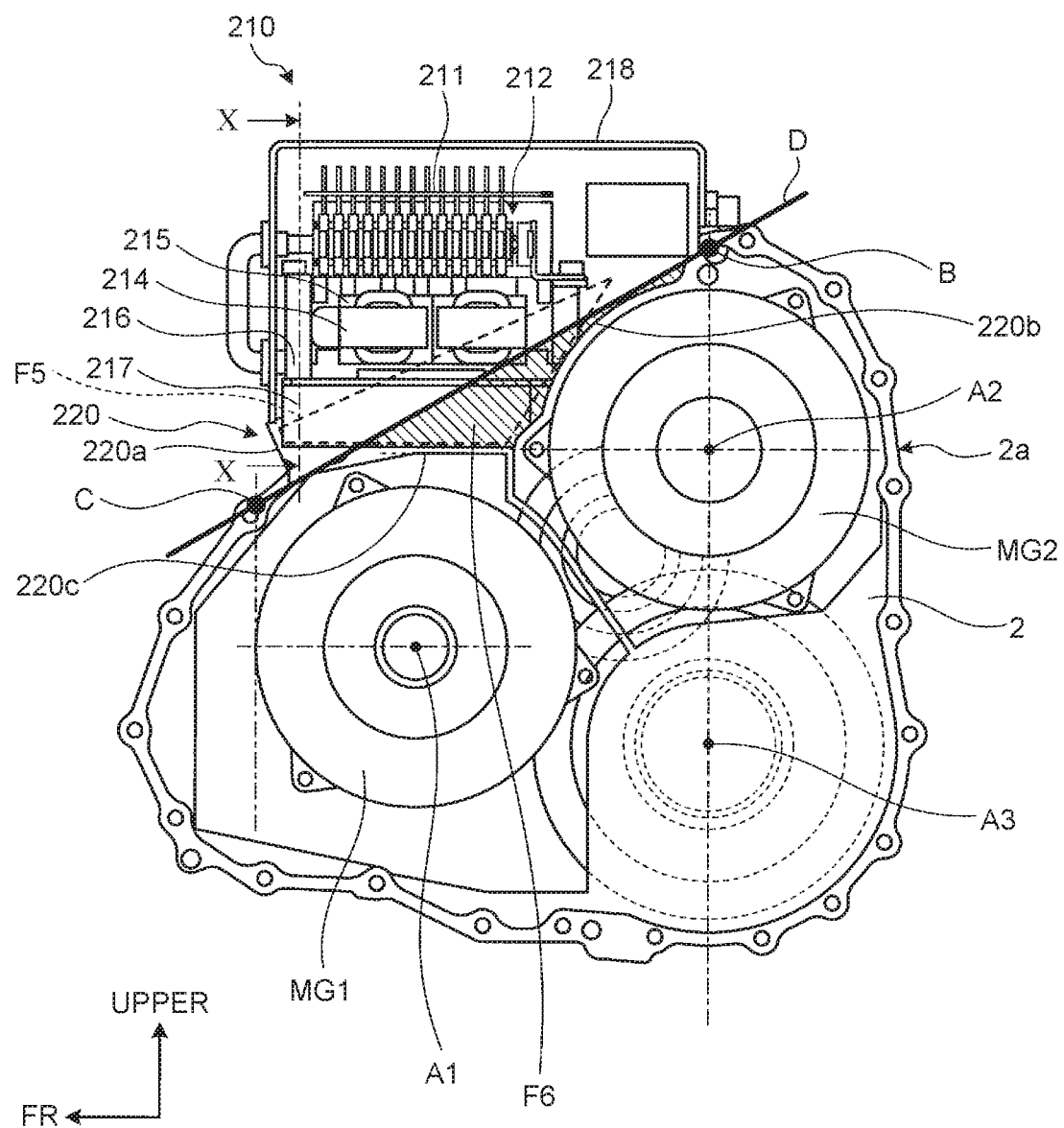
FIG. 9 is a sectional view orthogonal to the axial direction of the transaxle case to which the PCU is mounted in the vehicle drive system according to the second embodiment.
Figure 10:
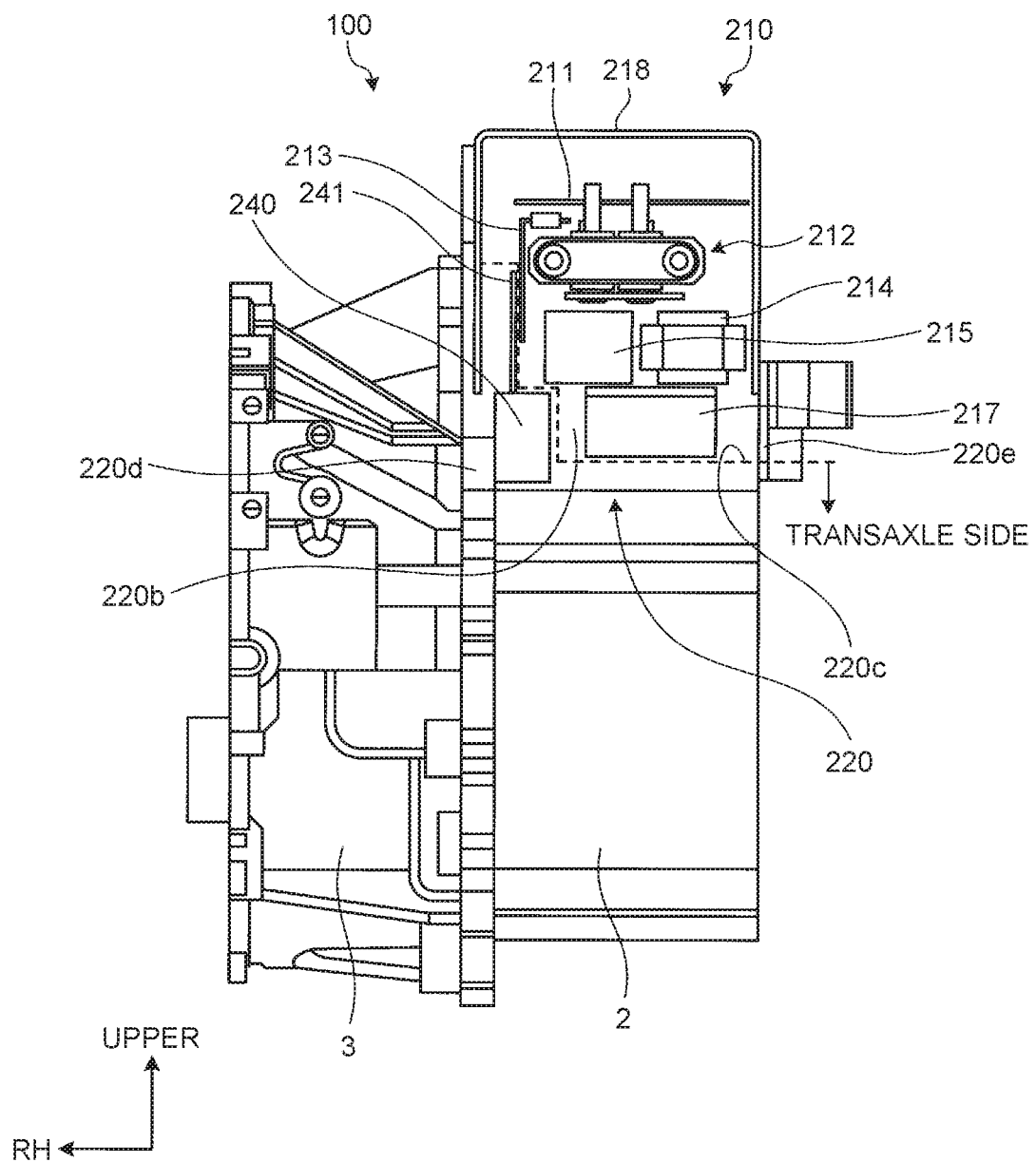
FIG. 10 is a sectional view of the PCU mounting section in which the PCU is mounted, taken along line X-X in FIG. 9.

FIG. 8 is a sectional view orthogonal to the axial direction of the transaxle case 2 to which a PCU 210 is not mounted. FIG. 9 is a sectional view orthogonal to the axial direction of the transaxle case 2 to which the PCU 210 is mounted. FIG. 10 is a view of a PCU mounting section 220 in which the PCU 210 is mounted, taken along line X-X of FIG. 9.

As shown in FIG. 8, FIG. 9, and FIG. 10, in the vehicle drive system of the second embodiment, the PCU mounting section 220 having a mounting region F5 in which the PCU 210 is mounted is provided on the outer peripheral surface of the outer peripheral wall portion 2a that is the top of the transaxle case 2. The PCU mounting section 220 is configured to have a box-like shape having an opening upper surface, and includes a front wall portion 220a and a rear wall portion 220b facing each other in the vehicle front-rear direction, a right wall portion 220d and a left wall portion 220e facing each other in the vehicle left-right direction, a bottom wall portion 220c forming a bottom of the PCU mounting section 220, and an opening 220f that allows the upper surface to open. The rear wall portion 220b and the bottom wall portion 220c are parts of the outer peripheral wall portion 2a of the transaxle case 2. The rear wall portion 220b is inclined rearward relative to the bottom wall portion 220c in the vehicle front-rear direction, and has an obtuse angle defined between the rear wall portion 220b and the bottom wall portion 220c in a cross-section orthogonal to the axial direction of the transaxle case 2. Furthermore, a corner portion defined by the rear wall portion 220b and the bottom wall portion 220c is located in the recessed space formed between the first rotary electric machine MG1 and the second rotary electric machine MG2.

Respective heights of the front wall portion 220a, the rear wall portion 220b, the right wall portion 220d, and the left wall portion 220e of the PCU mounting section 220 of the second embodiment are lower than respective heights of the corresponding front wall portion 20a, rear wall portion 20b, right wall portion 20d, and left wall portion 20e of the PCU mounting section 20 of the first embodiment.

Figure 11:
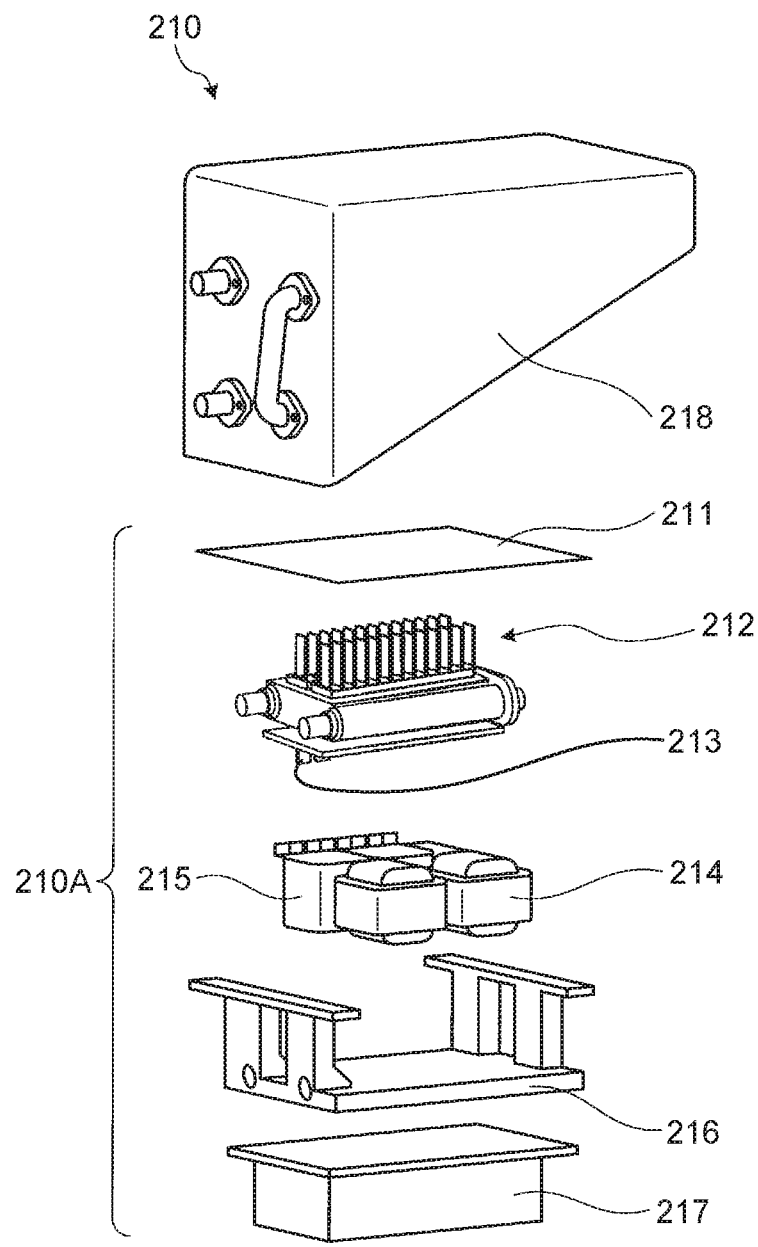
FIG. 11 is an exploded view of the PCU.

FIG. 11 is an exploded view of the PCU 210. As shown in FIG. 11, the PCU 210 includes a control board 211, a power stack 212, a PCU-side bus bar 213, a reactor 214, a capacitor 215, a water jacket 216, a DC-DC converter 217, a PCU cover 218, and others. The PCU cover 218 has a box-like shape having an opening lower surface, and is mounted to the top of the PCU mounting section 220 so as to close the opening 220f. In addition, the PCU cover 218 has a depth gradually deeper from the vehicle rear side toward the vehicle front side in the vehicle front-rear direction, and this depth is set to be deep enough to surround most of the periphery of a PCU assembly 210A described later.

In the second embodiment, the PCU 210 has a multilayer structure in the height direction, and is configured as the PCU assembly 210A formed by stacking and integrating the DC-DC converter 217, the water jacket 216, the reactor 214 and the capacitor 215, the power stack 212, and the control board 211 in this order from the lower side (transaxle 100 side) in the height direction of the PCU 210. In the PCU assembly 210A, the power stack 212, the reactor 214 and the capacitor 215, and the DC-DC converter 217 are fastened to the water jacket 216.

Further, in the PCU assembly 210A, the reactor 214 and the capacitor 215, the water jacket 216, and the DC-DC converter 217 are sequentially stacked below the power stack 212. Therefore, the PCU assembly 210A is arranged to protrude more downward (toward the transaxle 100 side), as compared with a case in which the reactor 214 and the capacitor 215, and DC-DC converter 217 are arranged side by side in a flat manner below the water jacket 216, for example.

Then, when the PCU 210 is mounted in the PCU mounting section 220, the PCU assembly 210A is first attached in the PCU cover 218. Then, the PCU cover 218 in which the PCU assembly 210A is attached is fixed to the top of the PCU mounting section 220 so as to cover the opening 220f of the PCU mounting section 220.

At this time, in the PCU mounting section 220, a part of the lower part of the PCU assembly 210A, for example, respective parts of the reactor 214 and the DC-DC converter 217 are located in the recessed space formed between the first rotary electric machine MG1 and the second rotary electric machine MG2.

Specifically, as shown in FIG. 9, when the PCU 210 is mounted in the PCU mounting section 220, a part of the lower portion of the PCU 210 is located within the space surround by the line D, the first rotary electric machine MG1, and the second rotary electric machine MG2, where the line D is defined by connecting the cross point B between the center line of the second rotary electric machine MG2 in the perpendicular direction and the transaxle case 2 and the cross point C between a tangent of the first rotary electric machine MG1 intersecting the center line of the first rotary electric machine MG1 in the horizontal direction and the transaxle case 2. In other words, in the cross-section orthogonal to the axial direction of the transaxle case 2, a part of the lower part of the PCU 210 is located within a region F6 surrounded by the rear wall portion 220b and the bottom wall portion 220c of the PCU mounting section 220 and the line D.

Thereby, in the mounting of the PCU 210 to the transaxle case 2, the recessed space formed between the first rotary electric machine MG1 and the second rotary electric machine MG2 is effectively used, to thereby reduce the height of the PCU 210 mounted to the transaxle case 2 to be lower, and improve the arrangement of the PCU 210.

Here, in the second embodiment, in the mounting of the PCU 210 to the transaxle case 2, after the PCU assembly 210A is mounted in the PCU mounting section 220 provided to the transaxle case 2 without mounting the PCU assembly 210A in the PCU cover 218, the PCU cover 218 may be fixed on the top of the PCU mounting section 220. This makes it possible to improve workability in the mounting of the PCU 210 to the transaxle case 2. On the other hand, as described above, after the PCU assembly 210A is attached in the PCU cover 218, the PCU 10 is then mounted in the PCU mounting section 220, and whereby it is possible to suppress contamination of foreign substances into the PCU assembly 210A from a time when the PCU assembly 210A is assembled to a time when the PCU 10 is mounted in the PCU mounting section 220.

In the second embodiment, the PCU 210 side and the transaxle 100 side are electrically connected to each other through a bus bar connection between the PCU-side bus bar 213 and a transaxle-side bus bar 241 inside the PCU mounting section 220.

The transaxle-side bus bar 241 is provided to a terminal block 240 partially protruding from the bottom wall portion 220c from the transaxle 100 side toward the PCU 210 side, as shown in FIG. 10. The terminal block 240 is located beside the DC-DC converter 217 at a lower part of the PCU 210 and on the right side in the vehicle left-right direction. The terminal block 240 may be located beside the DC-DC converter 217 at the lower part of the PCU 210 and on the left side in the vehicle left-right direction.

In the second embodiment, it can be configured that the terminal block 240 and the transaxle-side bus bar 241 are out of contact with the respective components included in the PCU 210, and at the same time, the height (mounting height) of the PCU 210 mounted to the transaxle case 2 can be reduced to be lower than the height of the PCU 210 in a case in which the terminal block 240 is located below the DC-DC converter 217 of the PCU 210.

Figure 12:
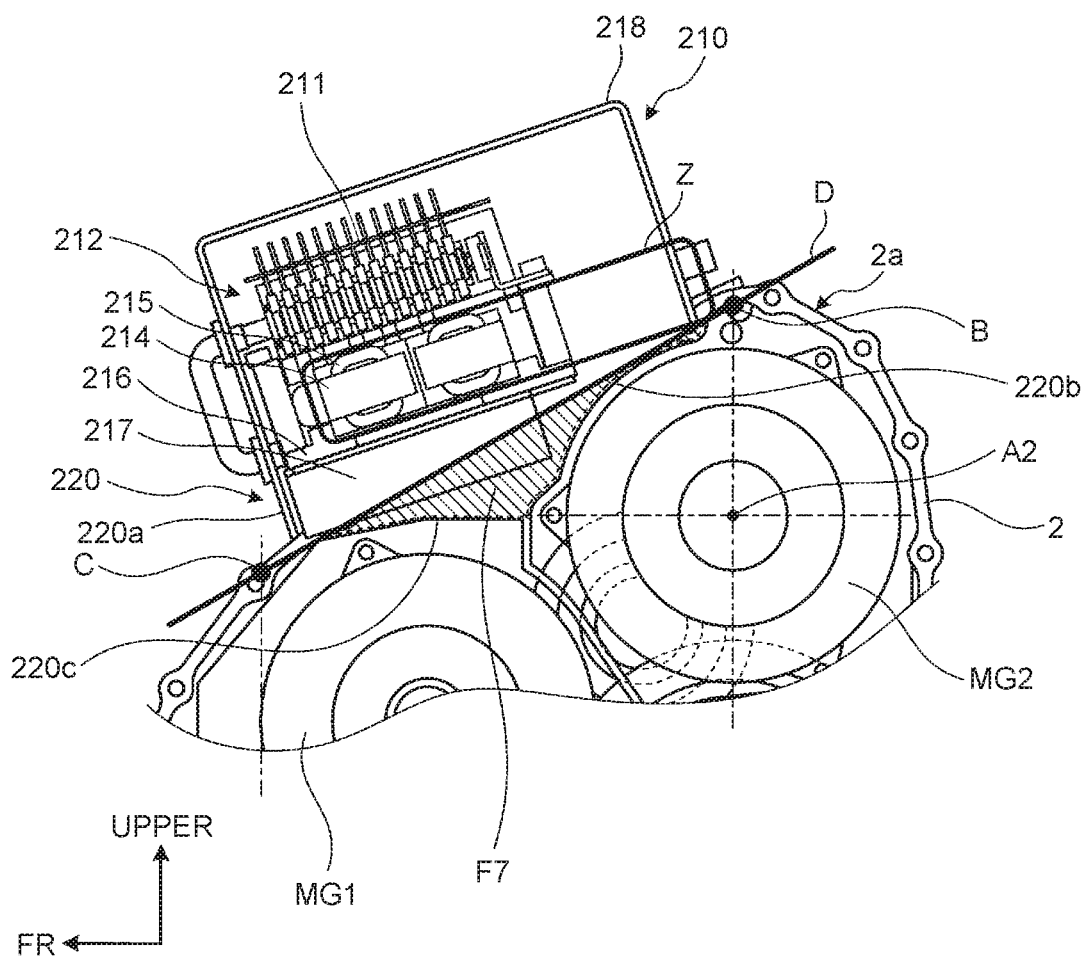
FIG. 12 is a view showing a case in which the PCU is mounted in the PCU mounting section with the PCU inclined from a horizontal direction.

FIG. 12 is a view showing a case in which the PCU 210 is mounted in the PCU mounting section 220 with the PCU 210 inclined from the horizontal direction. In the second embodiment, as shown in FIG. 12, the PCU 210 may be mounted in the PCU mounting section 220 with the PCU 210 inclined from the horizontal direction.

Then, in this state, as shown in FIG. 12, in the cross-section orthogonal to the axial direction of the transaxle case 2, a part of the lower part of the PCU 210 is located within a region F7 surrounded by the rear wall portion 220b and the bottom wall portion 220c of the PCU mounting section 220, and the line D. In FIG. 12, a part of the DC-DC converter 217 is located within the region F7.

As shown in FIG. 12, by arranging the PCU 210 to be inclined from the horizontal direction, disposing a part of the lower part of the PCU 210 within the region F7, and mounting the PCU 210 in PCU mounting section 220, the height (mounting height) of the PCU 210 mounted to the transaxle case 2 can be reduced to be lower.

Further, in a case in which the PCU 210 is inclined relative to the transaxle case 2, for example, it may be configured that the reactor 214 and the capacitor 215 are extended in the longitudinal direction so as to be contained in a frame Z in FIG. 12 such that the reactor 214 and the capacitor 215 are arranged in a flat manner, to thereby reduce the height of the PCU 210 to be lower.

Figure 13:
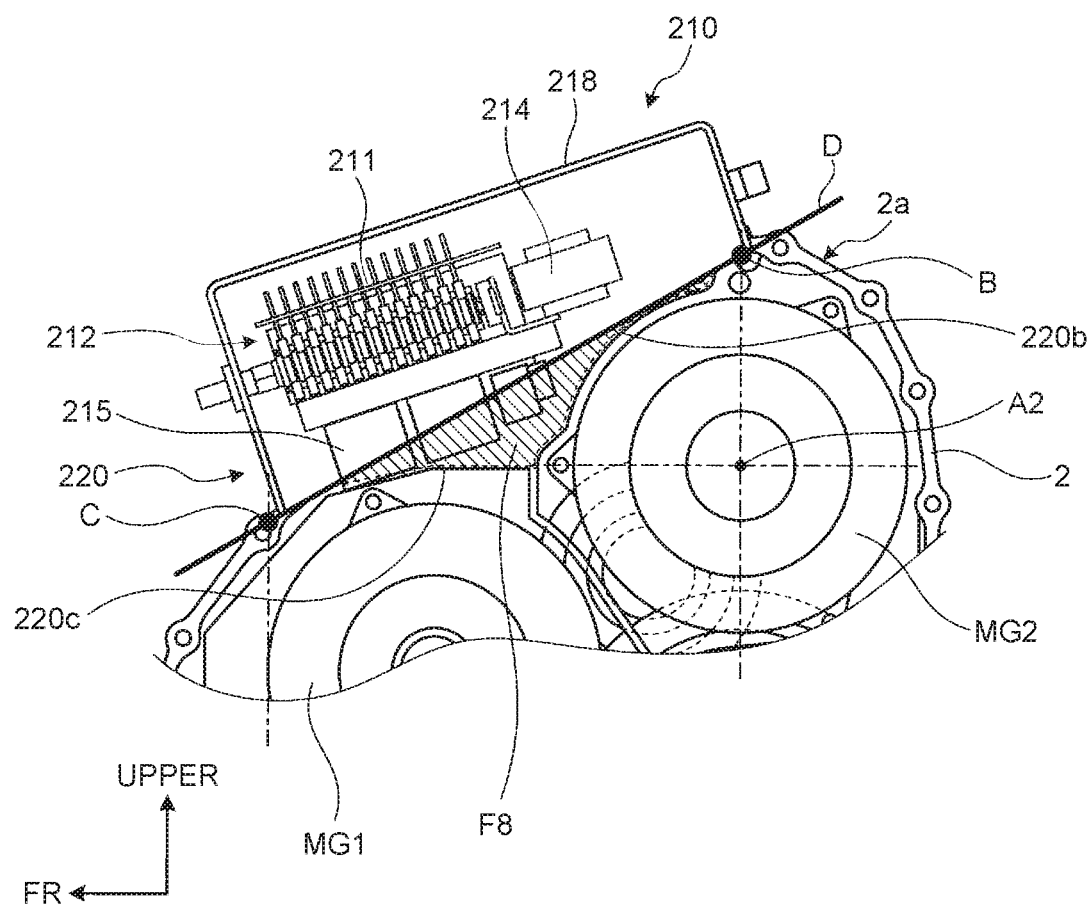
FIG. 13 is a view showing a case in which the PCU is provided with no direct current-direct current converter.

FIG. 13 is a view showing a case in which the PCU 210 is not provided with the DC-DC converter 217. In the second embodiment, as shown in FIG. 13, the PCU 210 may not be provided with the DC-DC converter 217. In this case, for example, as shown in FIG. 13, when the PCU 210 is mounted in a state of being inclined from the horizontal direction into the PCU mounting section 220, the capacitor 215 is arranged toward the transaxle case 2 side under the power stack 212 of the PCU 210. In addition, the reactor 214 is disposed in the longitudinal direction of the power stack 212 such that the reactor 214 is in contact with the coolers included in the power stack 212.

Then, as shown in FIG. 13, in the cross-section orthogonal to the axial direction of the transaxle case 2, a part of the lower part of the PCU 210 is located within a region F8 surrounded by the rear wall portion 220b and the bottom wall portion 220c of the PCU mounting section 220, and the line D, and the PCU 210 is mounted in the PCU mounting section 220. In FIG. 13, a part of the capacitor 215 is located within the region F8.

As shown in FIG. 13, while the PCU 210 not provided with the DC-DC converter 217 is disposed in the state of being inclined from the horizontal direction and a part of the lower part (the capacitor 215) of the PCU 210 is located within the region F8, the PCU 210 is mounted in the PCU mounting section 220, to thereby reduce the height of the PCU 210 mounted to the transaxle case 2 to be lower.

What is claimed is:

1. A vehicle drive system, comprising:
    a case accommodating a first rotary electric machine and a second rotary electric machine that are arranged to include respective rotational axes parallel to each other and to be radially adjacent to each other; and
    a power control device controlling electric power supplied to the first rotary electric machine and the second rotary electric machine, wherein:
    the case includes a peripheral wall portion surrounding the first rotary electric machine and the second rotary electric machine;
    the power control device is mounted in a mounting section provided on an outer peripheral surface of the peripheral wall portion;
    a lower part of the power control device is located within a space surrounded by a line connecting a first cross point and a second cross point, the first rotary electric machine, and the second rotary electric machine, the first cross point being a cross point of a center line of the second rotary electric machine in a perpendicular direction with the case located on a side where the mounting section in which the power control device is mounted is located, the second cross point being a cross point of a tangent of the first rotary electric machine intersecting a center line of the first rotary electric machine in a horizontal direction with the case located on the side where the mounting section is located; and
    the vehicle drive system further comprising a terminal block that holds a second connection terminal electrically connected to a first connection terminal included in the power control device, and the terminal block is disposed at a side of the lower part of the power control device.

2. The vehicle drive system according to claim 1, further comprising:
    an input member drivingly coupled to an internal combustion engine; and
    a power distribution device distributing driving power of the input member to the first rotary electric machine, wherein
    the second rotary electric machine is disposed obliquely above the first rotary electric machine, and
    at least a part of the space is located in a recessed space formed between an outer peripheral surface of the first rotary electric machine and an outer peripheral surface of the second rotary electric machine.

3. The vehicle drive system according to claim 1, wherein the power control device is mounted in a state of being inclined from the horizontal direction in the mounting section.

4. The vehicle drive system according to claim 1, wherein the power control device includes a control board, a power card and a cooler, a reactor and a capacitor, and a water jacket that are sequentially arranged from a top in a height direction.

5. The vehicle drive system according to claim 4, wherein the power control device includes a direct current-direct current converter disposed below the water jacket.

6. The vehicle drive system according to claim 1, wherein when the power control device is not provided with a direct current-direct current converter:
    a control board, a power card and a cooler, and a capacitor are disposed sequentially from a top in a height direction; and
    a reactor is disposed in a longitudinal direction of a power stack including the power card and the cooler in such a manner that the reactor is in contact with the cooler.

* * * * *